US012788187B1

(12) United States Patent
Simone et al.

(10) Patent No.: US 12,788,187 B1
(45) Date of Patent: Nov. 10, 2026

(54) CUTTING BOARD DISH

(71) Applicant: Nookware LLC, San Diego, CA (US)

(72) Inventors: Alexander Simone, San Diego, CA (US); Anton Shvydkyi, Boiarka (UA)

( * ) Notice: Subject to any disclaimer, the term of this patent is extended or adjusted under 35 U.S.C. 154(b) by 324 days.

(21) Appl. No.: 18/584,850

(22) Filed: Feb. 22, 2024

Related U.S. Application Data

(60) Provisional application No. 63/447,454, filed on Feb. 22, 2023.

(51) Int. Cl.
*A47J 47/00* (2006.01)
*A47G 19/02* (2006.01)

(52) U.S. Cl.
CPC ............ *A47J 47/005* (2013.01); *A47G 19/02* (2013.01)

(58) Field of Classification Search
CPC .......... A47J 47/00; A47J 47/005; A47G 19/02
See application file for complete search history.

(56) References Cited

U.S. PATENT DOCUMENTS 3,995,844 A * 12/1976 Hellman ............... A47J 47/005 269/54.5
5,984,294 A * 11/1999 Bogomolny .......... A47J 47/005 269/307

* cited by examiner

*Primary Examiner* — Tyrone V Hall, Jr.
(74) *Attorney, Agent, or Firm* — Invention To Patent Services; Alex Hobson

(57) ABSTRACT

A cutting board dish has a central planar dish portion configured within the perimeter rim and the raised rim portion. The central planar dish portion is planar or flat and the raised rim portion extends up from the central planar dish portion to the perimeter rim. A raised rim portion transitions down to a cutting rim extension portion. The cutting rim extension portion includes a planar extension portion that is a planar extension from the central planar dish portion to the perimeter rim to allow a knife to extend out from the central planar dish portion along the cutting rim extension. The cutting rim extension portion may include a fluid catcher, a depression in the cutting rim extension portion to collect fluid such as juices from some foods.

15 Claims, 8 Drawing Sheets

CUTTING BOARD DISH

CROSS REFERENCE TO RELATED APPLICATIONS

This application claims the benefit of priority to U.S. provisional patent application No. 63/447,454, filed on Feb. 22, 2023; the entirety of which is hereby incorporated by reference herein.

BACKGROUND OF THE INVENTION

Field of the Invention

The invention relates to food preparation and more particularly to cutting boards used in the preparation of food.

Background

When preparing food at home for a meal or snack it is common practice to prepare food on a cutting board before transferring it to a dish for consumption. This leaves the user with both the cutting board and the dish to clean. Even for a simple snack such as a single fruit or vegetable, both the cutting board and dish device are necessary because neither device does the other job well.

Standard cutting boards do not function well as plates for several reasons. Most cutting boards have a flat design which does not prevent food items from sliding off when transporting with food or when sliding food around with utensils during the eating process. Even with a fluid catcher around the perimeter of available cutting boards, the flat design makes wet food items like oranges, steaks, and tomatoes potentially leak enough juice that it can quickly overload the fluid catcher or a portion of it and spill over the sides. Other popular cutting board features such as its large rectangular size and handle(s) for holding make it a less optimal option for dining on. Because of these reasons and more typical users choose to transfer prepared food from the cutting board to a dish before consumption.

Standard Dishes likewise do not in most cases make a good substitution for a cutting board. The material most dishes are made out of can scratch and get damaged if cut with a knife. Dishes made of fragile material such as ceramic or glass can break if ingredients are chopped on it. Also, the raised edges that are useful for keeping food and juices on the dish can make it difficult to use a large chef's knife.

As can be seen, many scenarios of food preparation can result in using a cutting board and dish requiring the cleaning of both.

SUMMARY OF THE INVENTION

The invention is directed to a cutting board dish that has a central planar dish portion configured within the perimeter rim. The central planar dish portion is planar or flat, wherein a top surface of the central planar dish portion extends in a plane, a cutting plane as described later herein. A raised rim portion extends up from the central planar dish portion to the perimeter rim, when the cutting board dish is resting on a cutting board dish base base on a horizontal surface. The raised rim portion configured around the central planar dish portion secures food items within the central planar dish portion. The food items may be placed on the central planar dish portion for cutting, wherein the cutting board dish is used as a cutting board, and may also be used as a plate. The cutting board dish includes a raised rim portion that extends around most of the perimeter. The raised rim portion extends up from the central planar dish portion to the perimeter rim when the cutting board dish is resting on a horizontal surface, such as a table. A raised rim portion transitions down to a cutting rim extension portion. The transition rim portions may curve down from the raised rim portion to the cutting rim extension portion with curved surfaces. The transition rim portions may have a concave top surface from the raised rim portion to the cutting rim extension portion. The cutting rim extension portion includes a planar extension portion that is a planar extension from the central planar dish portion to the perimeter rim. The cutting rim extension portion may include a fluid catcher, a depression in the cutting rim extension portion to collect fluid such as juices from some foods.

The cutting board dish may enable a customer to reduce plates and dishes as the cutting board dish can be used for both cutting and as a plate to eat food therefrom, including food just cut on the cutting board dish. The cutting board dish may be sized for a single person to eat therefrom or may be larger, such as a platter size, wherein food can be prepared or cut thereon and then served thereon.

The cutting board dish may have any suitable shape defined by the shape of the perimeter rim, including circular, rectangular, and irregularly shaped. In some cases, the raised rim portion extends in a geometric shape, such as an arc of a circle or in a rectangular shape and the cutting rim extension extends out from this shape to create a protrusion in the otherwise regular geometric shaped formed by the raised rim portion.

The cutting rim extension portion may be configured along a small portion of the perimeter rim, such as no more than about 45% of the length of the perimeter rim, or no more than about 30%, or even no more than 20%, and any range between and including the percentages provided Put another way, the cutting rim extension may not extend more than 90 degrees around the perimeter rim, no more than about 60 degrees, or even no more than about 45 degrees and any range between and including the degrees provided. A funnel portion, defined by the two transition rim portions on opposing sides of the planar extension portion may also be spaced no more than about 90 degrees around the perimeter rim, no more than about 60 degrees, or even no more than about 45 degrees and any range between and including the degrees provided.

The cutting board dish may have a perimeter rim that is circular having diameter of about 10 cm or more, about 15 cm or more, about 20 cm or more, about 25 cm or more, about 30 cm or more about 50 cm or more, about 80 cm or less, and any range between and including the values provided. The central planar dish portion may have a diameter of about 5 cm or more, about 10 cm or more, about 20 cm or more about 30 cm or more, about 40 cm or more, about 50 cm or more and any range between and including the values provided. The cutting board dish may be rectangular in shape and have a length and/or width that is about cm or more, about 12 cm or more, about 20 cm or more, about 30 cm or more about 40 cm or more, about 60 cm or more, about 80 cm or less and any range between and including the values provided. The cutting rim extension portion may have a length of about 3 cm, about 6 cm or more, about 12 cm or more, about 16 cm or more and any range between and including the values provide. The fluid catcher can have a depth from the top surface of the cutting rim extension portion of about 0.1 cm or more, about 0.2 cm or more, about 0.5 cm or more, about 1 cm or more, about 2 cm or more, about 3 cm or less and any range between and including the values provided. The raised rim portion can have a height from the top surface of the central planar dish portion to the perimeter rim, or highest point of the raised rim portion of about 1 cm or more, about 2 cm or more, about 4 cm or more about 6 cm or more, or about 8 cm or more, and any range between and including the value provided. The height of the raised rim portion may be high enough to retain food items thereon when the cutting board dish is used as a dish or plate and may be high enough to effectively direct food items to slide off through the cutting rim extension.

In one preferred embodiment, the present invention comprises a cutting board dish that is designed to be a cutting board with properties that make it function more like a standard dinner plate or dish. This can be accomplished by raising the edges of most of the perimeter of the cutting board to more resemble a standard dish. The small portion of the plate's perimeter that is the cutting rim extension portion enables the cutting board dish to be used as a cutting board, wherein the knife can cut down into the central planar dish portion while extending out along the cutting rim extension portion. The cutting rim extension portion extends in a plane with the top plane of the central planar dish portion to enable the cutting edge of the knife to extend from the central planar dish portion out along the cutting rim extension portion. This cutting rim extension portion may have a fluid catcher to collect juices and direct them to the center of the dish.

The geometry of the cutting board dish allows the user to use the cutting board as a more traditional looking dinner plate. Second, it only gives the user one device to clean instead of two. Third, it saves on storage space as the user can store multiple cutting dishes to use as plates and as cutting boards. This is useful in a situation where space is limited such as a small living space, mobile home, or when camping. Fourth, the mostly raised edges make it easier to pour the contents of the cutting board into a pot.

The material of the cutting board can be made of materials popular in standard cutting boards like wood, plastic, rubber, marble, or bamboo. The cutting board can also be made square or circular which are more common shapes for plates. The cutting board dish may be made by machining, injection molding, laser cutting, vacuum forming, or pressing from a sheet of metal, for example.

The exemplary cutting board dish may comprise a foot on the bottom that is configured to provide a non-slip surface. The foot may protrude from the bottom of the cutting board dish and may be a ring or a planar piece of material. The bottom of the cutting board dish may have a recess to receive the foot therein and the foot may be detachably attachable to the cutting board dish. The foot may be made out of a high friction material, such as rubber, urethane or silicone and may have a static coefficient of friction when tested against a metal surface, such as aluminum or tool steel of about 0.3 or more, and preferably 0.5 or more, and even more preferably 0.7 or more to prevent the cutting board dish from slipping when cutting foot items on the board.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
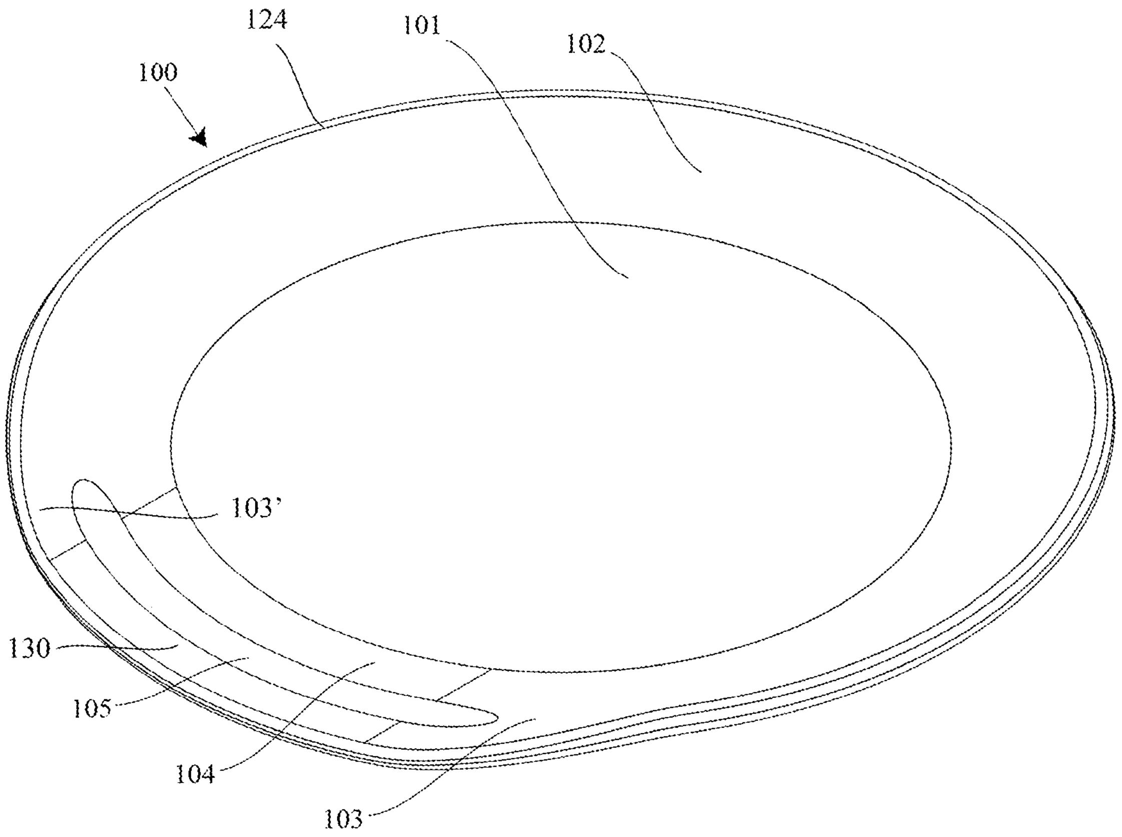
FIG. 1 is a perspective view of one embodiment of a cutting board dish.
Figure 2:
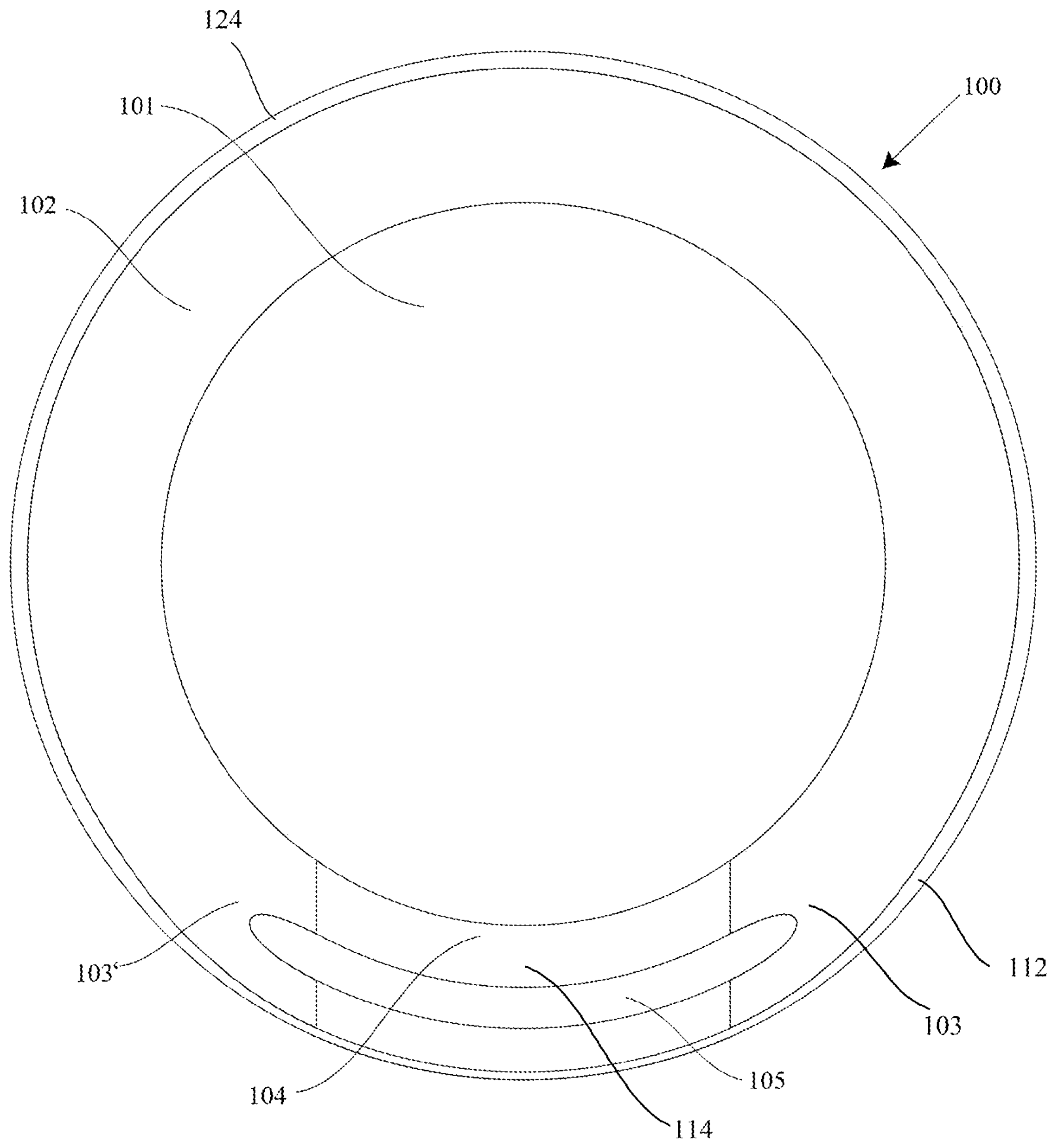
FIG. 2 is a top-down view of the cutting board dish shown in FIG. 1.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations, and improvements of the described embodiments, will occur to those skilled in the art and all such alternate embodiments, combinations, modifications, improvements are within the scope of the present invention.

Referring to the FIG. 1 to 5, an exemplary cutting board dish 100 has a central planar dish portion 101 that is configured within the perimeter rim 112. The central planar dish portion is planar and a raised rim portion extends up from the central planar dish portion to the perimeter rim 112. This central planar dish portion includes a flat region where the majority of food items are configured to be placed when the device is used as a cutting board and as a plate. The cutting board dish 100 includes a raised rim portion 102 that extends around most of the perimeter. The raised rim portion 102 transitions down to the cutting rim extension portion 104 along transition rim portions 103, 103'. The two transition rim portions create a funnel portion 130 along the portion of the perimeter rim 112 between the two transition rim portions 103, 103' that aids in transferring fluid items from the cutting board dish 100 to another container. The transition rim portions may curve down from the raised rim portion to the cutting rim extension portion with curved surfaces. The cutting rim extension portion 104 includes a planar extension portion 114 that is a planar extension from the central planar dish portion 101 to the perimeter rim 112. The cutting rim extension portion 104 may include a fluid catcher 105, a depression in the cutting rim extension portion to collect fluid, such as juices from some foods.

Figure 3:
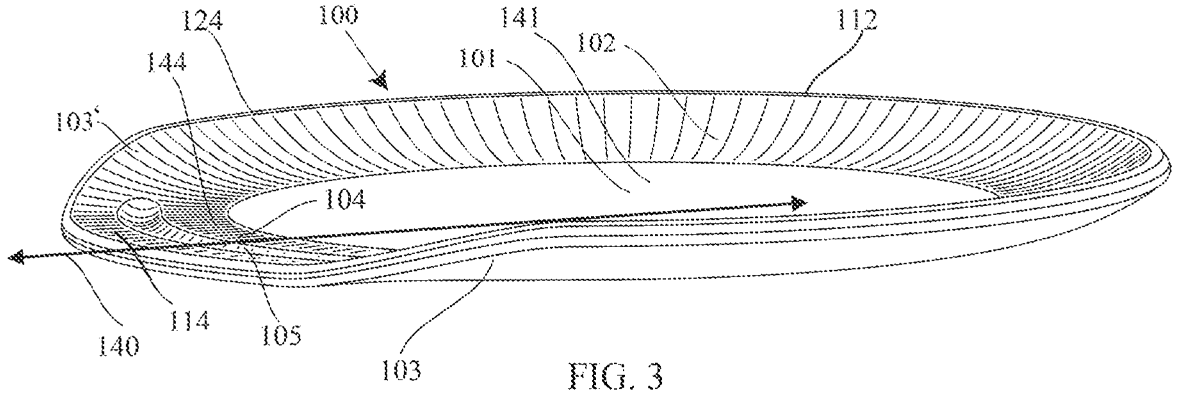
FIG. 3 is a perspective view of the cutting board dish shown in FIG. 1 with shading to show curvature of the raised rim portion and the transition rim portion.
Figure 4:
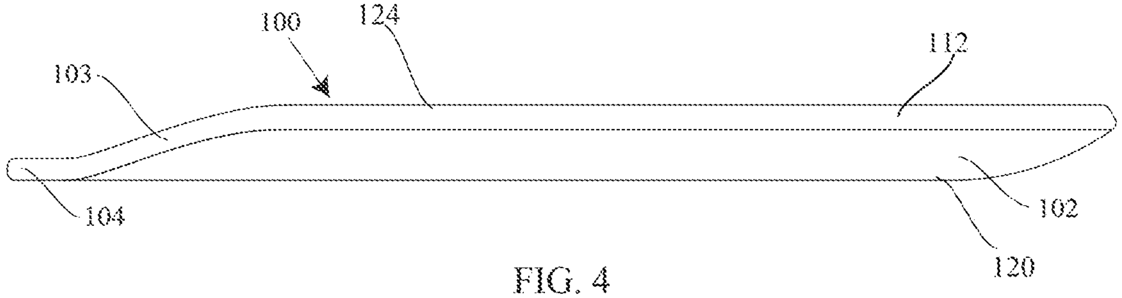
FIG. 4 is a side view of the cutting board dish shown in FIG. 1.
Figure 5:
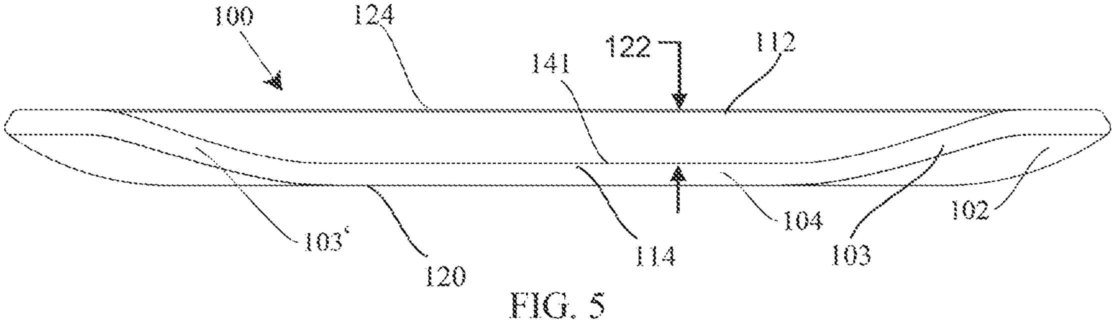
FIG. 5 is a front view of the cutting board dish shown in FIG. 1.

As shown in FIGS. 3 to 5, the raised rim portion 102 includes shading to show curvature from the central planar dish portion 101 to the perimeter rim 112. Also, the transition rim portions 103, 103' have curved surfaces to provide a smooth transition from the raised rim portion to the cutting rim extension portion. As shown in FIG. 5, the cutting rim extension portion is a planar extension from the central planar dish portion.

As shown in FIG. 3 the cutting rim extension portion 104 includes a planar extension portion 114 that is a planar extension from the central planar dish portion 101 to the perimeter rim 112. In an exemplary embodiment, the top surface 141 of the central dish portion 101 and top surface 144 of the planar extension portion 114 extend along a cutting plane 140 to enable a cutting implement to extend down from outside the perimeter rim 112 of the cutting board dish 100 into the central planar dish portion 101. Note that the fluid catcher 105 is recessed from this cutting plane 140, or from the top surface 144 of the planar extension portion 114. Put another way, planar extension portion 114 of the cutting rim extension portion 104 has a top surface that is parallel with the top surface of the central planar dish portion 101.

As shown in FIG. 5, the raised rim portion 102 is elevated up from the top surface 141 of the central planar dish portion 101 a height 122 that may be about 1 cm or more, about 2 cm or more, about 4 cm or more about 6 cm or more, or about 8 cm or more, and any range between and including the value provided. The cutting board dish base 120 is shown in FIG. 5 and the base may be configured to rest on a horizontal surface during use, such as a counter top. The perimeter rim 112 forms a perimeter 124 of the cutting board dish 100 that may be the highest point of the raised rim portion.

Figure 6:
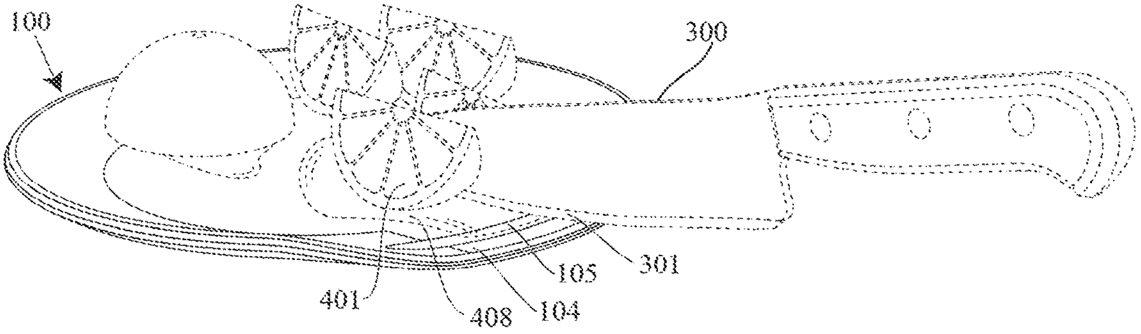
FIG. 6 is a perspective view of one an exemplary cutting board dish being used as a cutting board with a knife cutting food items in the central planar dish portion and extending out along the cutting rim extension portion.

As shown in FIG. 6 the cutting board dish 100 is being used as a cutting board, wherein the knife 300 and the knife cutting edge 301 extend from the central planar dish portion 101 out along the cutting rim extension portion 104. The food items 401 are being cut and fluid 408 is flowing into the fluid catcher 105.

Figure 7:
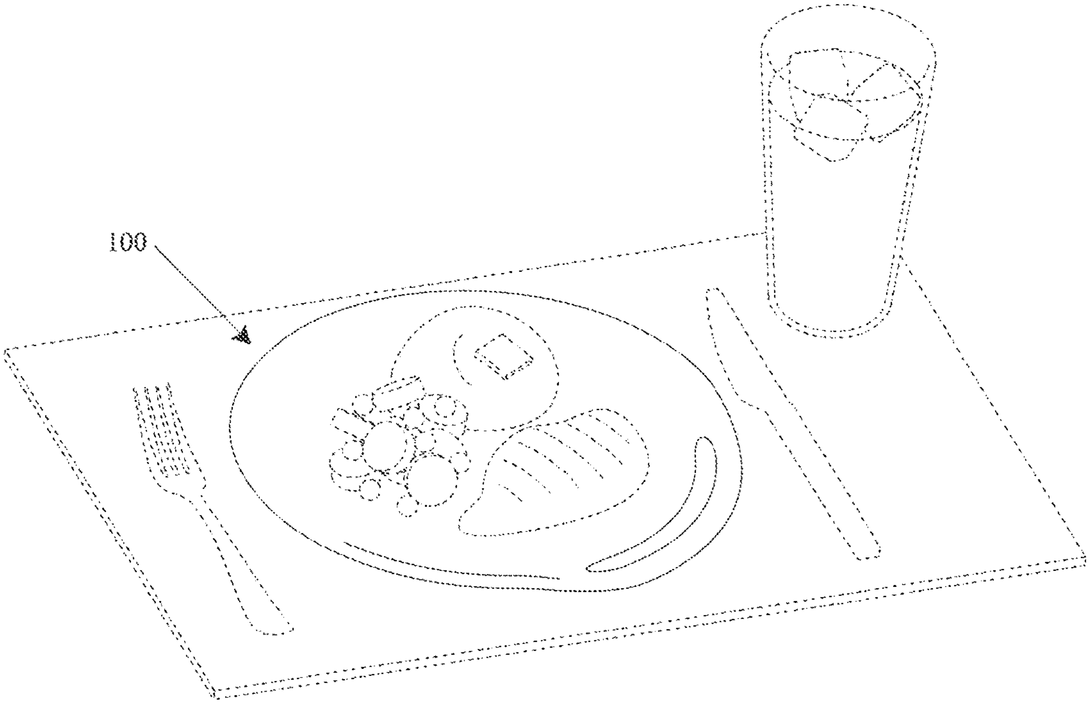
FIG. 7 is a perspective view of the exemplary cutting board dish shown in FIG. 6 being used now as a plate or dish to retain food items on thereon for consumption.

As shown in FIG. 7, the cutting board dish 100 is being used as a dish or plate to retain food items thereon for consumption.

Figure 8:
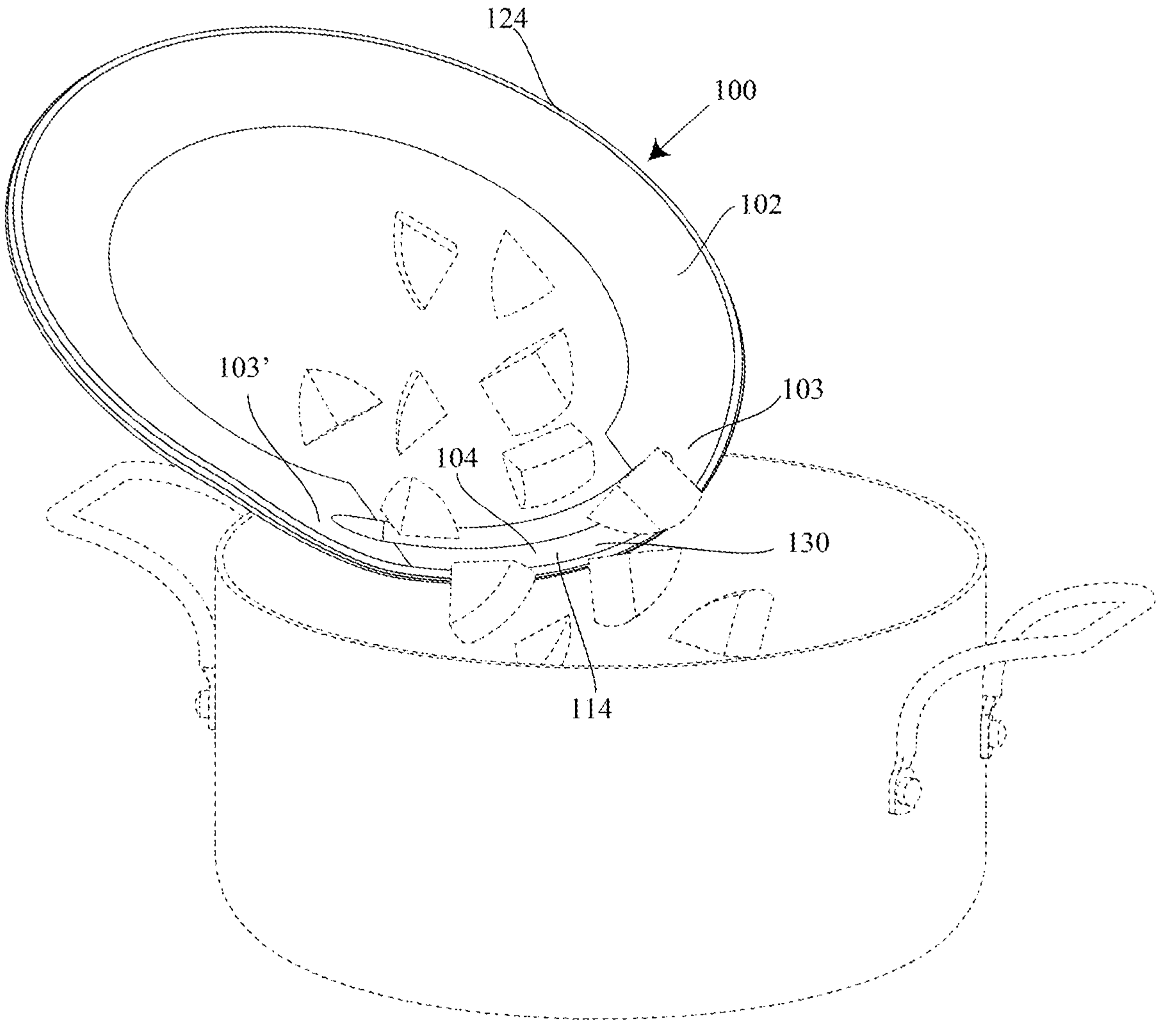
FIG. 8 is a perspective view of the exemplary cutting board dish shown in FIG. 6 being used to pour chopped food items into a pot, wherein the raised rim portion makes it easier for the user to direct and guide the food items into the pot without them falling off the edge.

As shown in FIG. 8, the cutting board dish is being used to direct food items into a pot wherein the funnel portion 130 between the cutting rim extensions 103, 103' provides a spout for the food items to slide through. The raised rim portion 102 aids in preventing the food items form sliding off along this portion of the perimeter. The cutting rim extensions may have a curved top surface from the cutting rim extension portion 104, or planar extension portion 114, to the raised rim portion 102.

Figure 9:
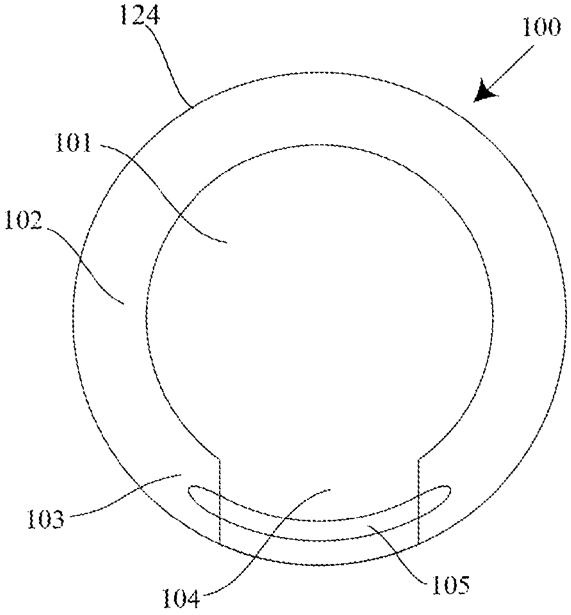
FIG. 9 shows a top-down view of an exemplary cutting board dish having a circular rim geometry or shape and features consistent with the present description.

FIG. 9 shows an exemplary cutting board dish 100 that has a circular shape, wherein the perimeter rim extends in a complete circle.

Figure 10:
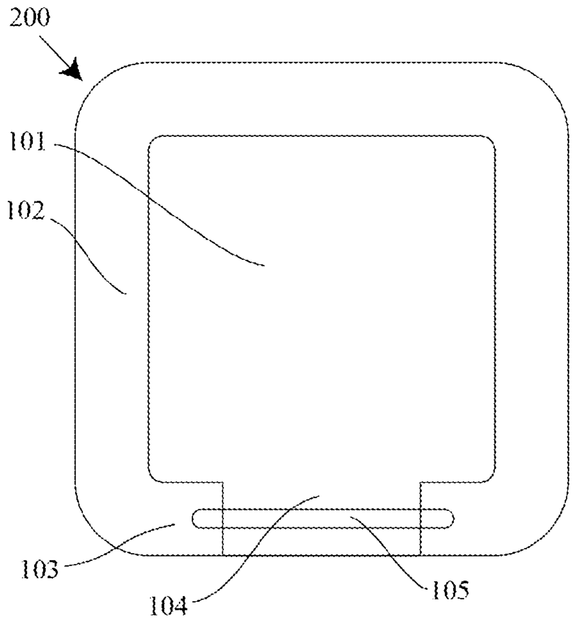
FIG. 10 shows a top-down view of an exemplary cutting board dish having a rectangular rim geometry or shape and features consistent with the present description.

FIG. 10 shows an exemplary cutting board dish 200 that has a rectangular shape, wherein the perimeter rim extends in a complete rectangle with curved corners, or corners that extend in a radius.

Figure 11:
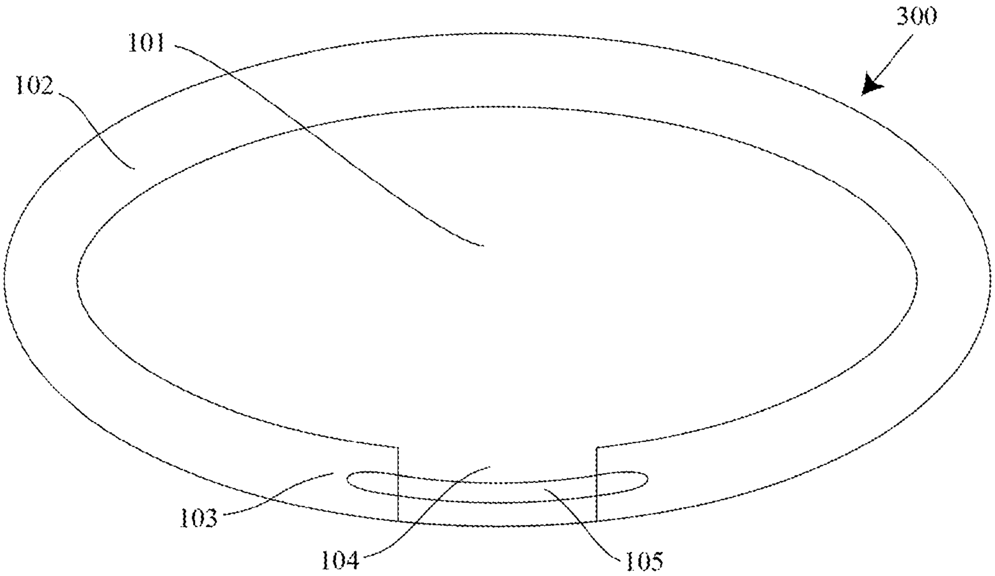
FIG. 11 shows a top-down view of an exemplary cutting board dish having an oval rim geometry or shape and features consistent with the present description.

FIG. 11 shows an exemplary cutting board dish that has an oval shape, wherein the perimeter rim extends in an oval.

Figure 12:
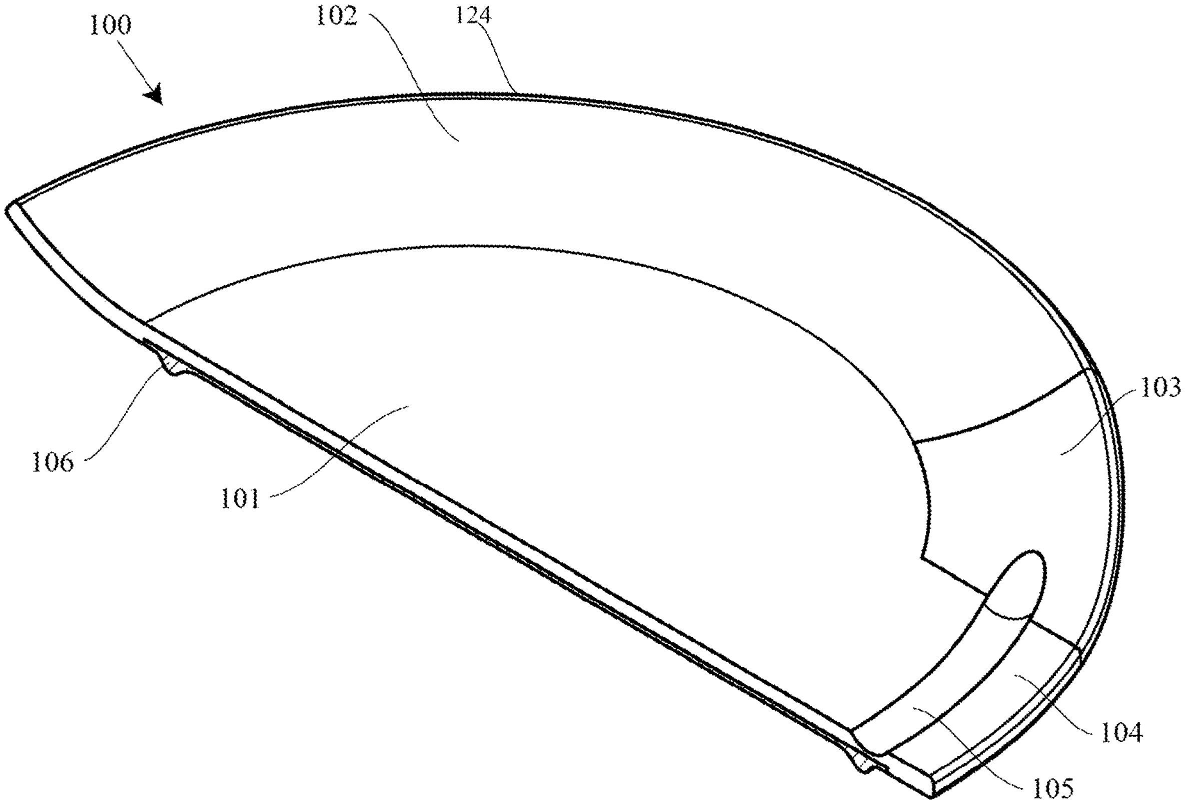
FIG. 12 shows a perspective cut away view of an exemplary cutting board dish having a fluid catcher and a non-slip foot on the bottom.

FIG. 12 show a perspective cut away view of an exemplary cutting board dish 100 having a fluid catcher 105 and a non-slip foot 106 on the bottom.

Figure 13:
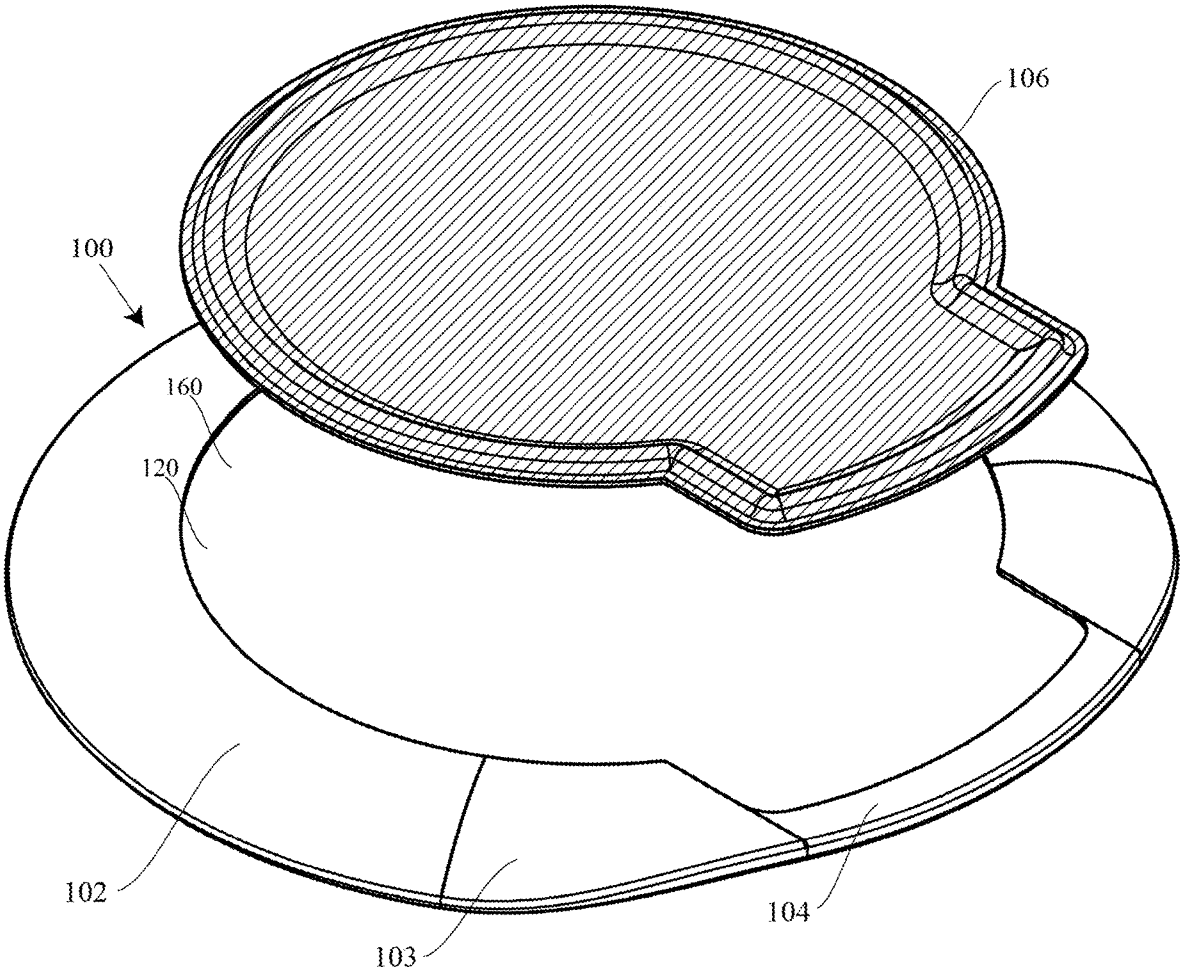
FIG. 13 shows a perspective view of the bottom side of the exemplary cutting board dish having the non-slip foot detached from the bottom of the cutting board dish.

FIG. 13 show a perspective view of the bottom side of the exemplary cutting board dish having the non-slip foot 106 detached from the bottom of the cutting board dish 100. The non-slip foot 106 may be configured to fit within a recess 160 in the cutting board dish base 120 to retain the non-slip foot in position.

It will be apparent to those skilled in the art that various modifications, combinations, and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A cutting board dish comprising:

a) a central planar dish portion;

b) a perimeter rim that extends around a perimeter of the cutting board dish;

c) a raised rim portion that extends up from the central planar dish portion to said perimeter rim;

d) a cutting rim extension portion having a top surface that extends parallel with a top surface of the center planar portion to said perimeter rim; and e) a transition rim portions that extend between the raised rim portion and the cutting rim extension portion;

wherein the cutting rim extension is no more than 30% of a length of the perimeter rim;

wherein the cutting rim extension portion further comprises a fluid catcher that is a recess extending across the cutting rim extension and between the raised rim portions on either side of the cutting rim extension portion, wherein the fluid catcher is configured to catch fluid; and wherein the fluid catcher extends into the transition rim portions.

2. The cutting board dish of claim 1, wherein the fluid catcher has a depth from said top surface of the cutting rim extension portion of at least 0.1 cm.

3. The cutting board dish of claim 1, wherein the fluid catcher has a depth from said top surface of the cutting rim extension portion of at least 0.2 cm.

4. The cutting board dish of claim 1, wherein the transition rim portions are curved surfaces from the raised rim portion to the cutting rim extension.

5. The cutting board dish of claim 1, wherein the fluid catcher has a depth from said top surface of the cutting rim extension portion of at least 0.1 cm.

6. The cutting board dish of claim 1, wherein the fluid catcher has a depth from said top surface of the cutting rim extension portion of at least 0.2 cm.

7. The cutting board dish of claim 1, wherein the raised rim portion has a height from the central planar dish portion that is at least 1 cm.

8. The cutting board dish of claim 1, wherein the raised rim portion has a height from the central planar dish portion that is at least 2 cm.

9. The cutting board dish of claim 1, wherein the perimeter rim is circular in shape.

10. The cutting board dish of claim 9, wherein the cutting rim extension extends no more than 90 degrees around the perimeter of the cutting board dish.

11. The cutting board dish of claim 1, wherein the perimeter rim is rectangular shaped.

12. The cutting board dish of claim 1, further comprising a non-slip foot configured on cutting board base.

13. The cutting board dish of claim 11, wherein the foot is a non-slip foot having a coefficient static coefficient of friction against a metal surface of at least 0.3.

14. The cutting board dish of claim 11, wherein the non-slip foot is detachably attachable to the bottom of the cutting board dish.

15. A cutting board dish comprising:

a) a central planar dish portion;

b) a non-slip foot configured on a cutting board base and having a coefficient static coefficient of friction against a metal surface of at least 0.3;

c) a perimeter rim that extends around a perimeter of the cutting board dish;

d) a raised rim portion that extends up from the central planar dish portion to said perimeter rim;

e) a cutting rim extension portion having a top surface that extends parallel with a top surface of the center planar portion to said perimeter rim;

f) a fluid catcher that is a recess extending across the cutting rim extension and between the raised rim portions on either side of the cutting rim extension portion, wherein the fluid catcher is configured to catch fluid;

wherein the fluid catcher has a depth of at least 0.1 cm wherein the cutting rim extension is no more than 30% of a length of the perimeter rim; and wherein the raised rim portion has a height from said top surface of the central planar dish portion that is at least 1 cm.

* * * * *